UNITED STATES PATENT OFFICE.

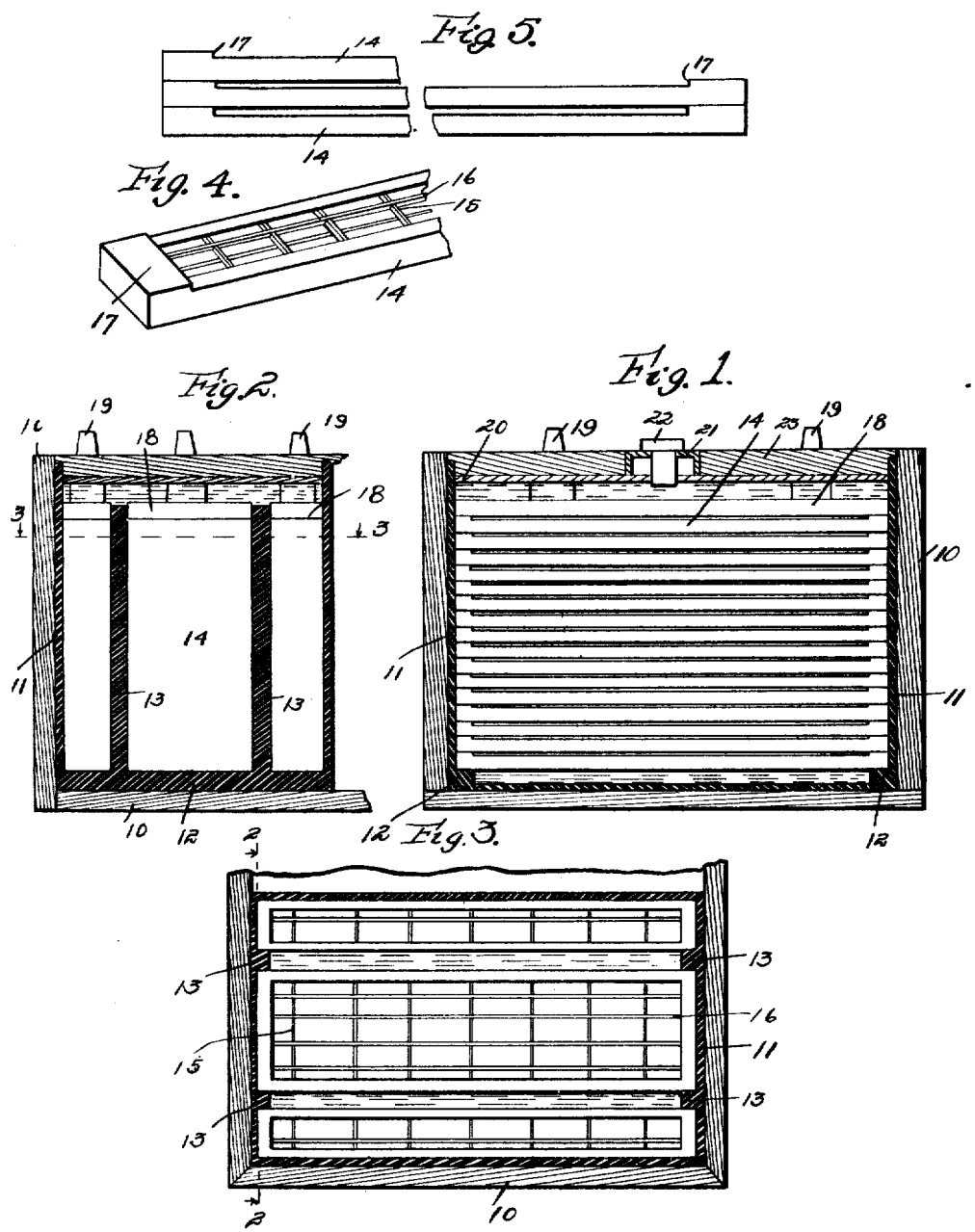

SAMUEL DILLER, OF DES MOINES, IOWA.

STORAGE BATTERY.

1,308,230. Specification of Letters Patent. Patented July 1, 1919.

Application filed October 16, 1917. Serial No. 196,959.

*To all whom it may concern:*

Be it known that I, SAMUEL DILLER, a citizen of the United States, and resident of Des Moines, in the county of Polk and State of Iowa, have invented a certain new and useful Storage Battery, of which the following is a specification.

The object of my invention is to provide a storage battery of simple, durable and inexpensive construction.

A further object is to provide a storage battery including a container having therein a plurality of piles or so called "plates," each plate or pile being comprised of a plurality of superimposed grids, the grids being formed with flanges or the like at their ends, whereby the main portions of the successive grids are spaced from each other, the ends of the grids being burned or otherwise fused or connected together for making each series of grids into a plate or pile, in which each grid is connected to the adjacent grid at the ends thereof by a comparatively broad flange or rib to afford a broad path for the current, thereby reducing the internal resistance in each pile or plate to a minimum.

Still a further object is to provide such a battery having the piles or plates made of grids, and made as hereinbefore mentioned, whereby all separators or insulating means between the successive grids of one plate or pile are done away with.

Still a further object is to provide a battery of the kind mentioned, having a central plate or pile, and having spaced on each side thereof outer plates or piles, each having grids as above mentioned spaced from each other, by parts of the grids at their ends, the ends of the grids being fused or otherwise connected together for forming each pile of grids into a unitary plate, in which free circulation is allowed between the successive grids, in which arrangement the central plates, for instance, may be the positive plates and the other plates the negative plates, so that no separators are needed between the plates.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, central, sectional view through a battery embodying my invention, the walls of the container, and the insulation being somewhat exaggerated in thickness, one of the plates or piles being shown in side elevation.

Fig. 2 shows a sectional view taken on the line 2—2 of Fig. 3.

Fig. 3 shows a horizontal, sectional view taken on the line 3—3 of Fig. 2, part of the grids of the piles or plates being omitted.

Fig. 4 shows a perspective view of one end of one of the grids, and

Fig. 5 shows a side elevation of a part of one of the piles of grids.

In the accompanying drawings, I have used the reference numeral 10 to indicate generally a container or so called "jar" forming part of my completed battery, and preferably provided with a lining 11 of nonconducting material.

The container is provided at its ends in its lower portion with a shoulder 12 upon which the plates, hereinafter described, may rest. The container is also provided at its ends with spaced, inwardly extending vertical ribs 13.

My improved battery is made with a plurality of plates, each comprising a pile of grids, which plates I will now describe.

I preferably use in each cell three plates or piles and preferably make the middle pile the positive one and somewhat wider than the two outer or negative piles or plates.

It will of course be understood that the grids of the plates are made of suitable material for the purpose.

Each grid is preferably made in the form of a rectangular metal frame 14, the sides and ends being connected by transverse grid members 15 and longitudinally arranged grid members 16.

The end members of the frame are formed with upwardly extending ribs or flanges 17 extending upwardly above the main bodies of the grids.

In each pile a plurality of grids are superimposed one above the other, as illustrated in Fig. 5.

The ends of the grids of each pile are then burned or fused together in any suitable way, whereby there is formed at each end of each pile a vertical post of the same width as the pile, and extending from the top to the bottom of the pile.

The bodies of the grids between the posts are spaced successively from each other.

Across the top of each pile or plate, I place a flat strip or bus-bar 18, which is preferably not perforated and is fused to the ribs or flanges 17 of the upper grid of the pile.

Each bus-bar 18 is provided with an upwardly extending connecting member 19.

Above the bus-bars is placed a cover 20 of nonconducting material, having openings to receive the connecting members 19.

Resting on the central portion of the cover 20 is a downwardly opening cap or the like 21 having in its upper portion a central opening to receive a plug 22, which opening registers with a central opening in the cover 20. Both of said openings are designed to be closed by the plug 22. The space above the cover 20, surrounding the cap 21 is filled with sealing wax or the like 23.

It will be understood that when the grids are placed in a pile they may be smeared with suitable paste, such as is used with batteries, which in itself forms no part of my present invention.

The advantages of a construction such as has been hereinbefore described are largely seen from the foregoing description.

It will have been noted that each plate or pile consists of a series of grids spaced from each other, except at their ends, and connected at their ends by ribs or flanges of substantially the same width as the grids.

The employment in a plate of a construction whereby the successive grids are connected together by the ribs or flanges which extend practically across the full width of the plate, has very important advantages in construction, resulting in a battery which is comparatively inexpensive to make, and which has relatively great longevity.

By connecting the ends of the grids in the manner herein described, there is afforded a free path for the discharge of electricity from grid to grid in the pile. I thereby reduce to a minimum the internal resistance in a plate. In order to explain this more fully I may mention that in many batteries the plates are connected by comparatively narrow lugs, which affords an insufficient path for the discharge of electricity, and causes internal resistance in the plates or between units of a positive or negative plate, as the case may be.

One bad result of an insufficient path for the discharge of electricity is warping of the plates.

Where the electrical discharge is from a single point on the plate, it becomes necessary, in the ordinary battery to use separators of insulating material between the plates of opposite polarity. Separators add to the expense of the battery and also reduce the efficiency of the battery by retarding the free circulation of the liquid in the battery which acts as a conductor for the current.

It will be observed that where plates warp they are liable to move into contact with each other and form a direct metallic circuit whereby the efficiency of the battery would be greatly reduced.

Where separators of wood or other material are used between the plates of the battery, the metallic matter from the plates tends to collect on the wooden separators. In other words, it seems that the pores of the separators become filled with lead or other metal and finally the separators become conductors instead of insulators and when that happens the battery deteriorates very rapidly.

By my construction I am able to do away with the necessity for using separator plates of insulating material between the different plates or piles. Thus the completed battery can be made much more cheaply than where insulating material or separator plates are necessary. By my construction whereby I do away with the necessity of using separator plates, I am able to avoid all the bad results above referred to.

By arranging the grids in a pile, as herein shown, it follows that if active material drops from the upper grids downwardly, such material drops on to the lower grids and is still usable, which would not be the case where such material drops on insulating means or separator plates, or into a heap at the bottom of the container.

By doing away with the separator plates, I afford facility for freer circulation of the liquid in the battery and the freer contact between the liquid and the active material.

Some changes may be made in the construction and arrangement of the parts of my improved battery, without departing from the essential features and purposes thereof, and it is my intention to cover by my present application any modified forms of structure or use of mechanical equivalents, which may be reasonably included within the scope of my claims.

I claim as my invention:

1. In a battery, a container, a central and outer pile therein forming negative and positive elements, the central pile comprising a plurality of susperimposed spaced grids, the ends of the grids being formed with ribs or flanges extending substantially across the plate from side to side, the adjacent ends and ribs of the grids of said central pile being electrically connected across the full width of the grids, whereby there is formed at each end of said central pile a continuous post of substantially the width of the pile.

2. In a battery, a container, a central plate or pile of one electrical polarity, spaced opposite plates or piles of another polarity, each pile consisting of a series of grids spaced one above the other, said grids having at their ends vertically extending ribs or flanges of substantially the full width of the grids, whereby the grids are held spaced apart, the ends of the grids of each pile being fused together to form a wide post, means for electrically connecting the adjacent ends of the grids at the opposite ends of the plates, non-conducting spacing members between the ends of the different plates, whereby a cell is formed having a plurality of plates, spaced from each other without the use of insulator plates, each pile or plate being formed with a series of grids spaced from each other without the use of insulator plates, the grids of each plate being connected together to permit the passage of electricity from grid to grid with a minimum of resistance.

Des Moines, Iowa, September 26, 1917.

SAMUEL DILLER.

Copies of this patent may be obtained for five cents each, by addressing the "Commissioner of Patents, Washington, D. C."